United States Patent [19]
Rikima

[11] Patent Number: 5,130,805
[45] Date of Patent: Jul. 14, 1992

[54] IMAGE FORMING APPARATUS WITH DETECTION AND INDICATION OF DEFECTIVE IMAGE DATA

[75] Inventor: Yuji Rikima, Tokyo, Japan

[73] Assignee: Kabushiki Kaisha Toshiba, Tokyo, Japan

[21] Appl. No.: 649,920

[22] Filed: Feb. 1, 1991

[30] Foreign Application Priority Data
Feb. 2, 1990 [JP] Japan .................................. 2-22261

[51] Int. Cl.⁵ .......................... H04N 1/21; H04N 1/23
[52] U.S. Cl. ................................... 358/296; 358/404; 358/405; 358/406
[58] Field of Search .............. 358/296, 401, 405, 406, 358/426, 404, 444, 445, 463, 464

[56] References Cited
U.S. PATENT DOCUMENTS
4,814,892 3/1989 Igarashi .............................. 358/296

Primary Examiner—Benjamin R. Fuller
Assistant Examiner—Scott A. Rogers
Attorney, Agent, or Firm—Foley & Lardner

[57] ABSTRACT

An image forming apparatus including a circuit for sequentially generating bit-image data in units of predetermined portions of image data, a circuit for forming an image on an image recording medium using the bit-image data generated by the generating circuit, a circuit for judging whether or not generation of the bit-image data by the generating circuit is performed within a predetermined period of time, and a circuit for, when the judging circuit determines that the generation of the bit-image data is not performed within the predetermined period of time, adding data indicating a detective image to the bit-image data, so that the image forming circuit produces an image on the image recording medium on the basis of the obtained bit-image data.

12 Claims, 8 Drawing Sheets

IMAGE FORMING APPARATUS WITH DETECTION AND INDICATION OF DEFECTIVE IMAGE DATA

BACKGROUND OF THE INVENTION

1. Field of the Invention

The present invention relates to an image forming apparatus, such as a laser printer, for receiving image data from, e.g., an external apparatus, and printing a recording image on a paper sheet on the basis of received data.

2. Description of the Related Art

Image formation in an image forming apparatus such as a laser printer is attained via, e.g., electrification, exposure, developing, copy, peeling, cleaning, and fixing processes. In such an image forming apparatus, an electrification unit, an exposure unit, a developing unit, a copy unit, a peeling unit, a cleaning unit, and the like are sequentially arranged around a photosensitive drum, and the apparatus also comprises a fixing unit for receiving a paper sheet from the peeling unit. These units are driven upon rotation of the photosensitive drum, thereby executing the above-mentioned image formation processes. In this manner, an image can be formed on a paper sheet.

In a laser printer of this type, a control system is divided into an engine control section for controlling the above-mentioned units to control operations for attaining the image formation processes and a printer control section for controlling operations of the engine control section. The engine and printer control sections are connected by exchanging commands and status data. The printer control section expands image information in units of pages supplied from an external equipment onto a partial memory to generate bit-image data, and then outputs the bit-image data to the engine control section.

In the laser printer, when the printer control section detects, based on the fact that a time required for expanding and generating the bit-image data on the partial memory exceeds a predetermined allowable time, that a defective image is formed, an alarm message for a user is transmitted outside a printer using a display unit incorporated in the printer.

When a continuous print operation including various print contents in units of print pages is performed, the following problem arises. More specifically, even when a time required for expanding and generating bit-image data of a print content of a given page on the partial memory exceeds the allowable time, and a defective image is formed, an alarm message transmitted outside the printer merely indicates that a defective image is formed on a certain page or pages during the continuous print operation, and a page/pages on which a defective image is formed cannot be specified.

SUMMARY OF THE INVENTION

It is an object of the present invention to provide an image forming apparatus which can specify a page or pages on which a defective image is formed when a defective image or images is or are formed on a certain page or pages.

The image forming apparatus of the present invention comprises a circuit for sequentially generating bit-image data in units of predetermined portions of image data; a circuit for forming an image on an image recording medium using the bit-image data generated by the generating circuit; a circuit for judging whether or not generation of the bit-image data by the generating circuit is performed within a predetermined period of time; and a circuit for, when the judging circuit determines that the generation of the bit-image data is not performed within the predetermined period of time, adding data indicating a defective image to the bit-image data, so that the image forming circuit produces an image on the image recording medium on the basis of the obtained bit-image data.

According to the present invention, when continuous image formation is performed on the pages of the image recording medium, if it is determined that generation of bit-image data of a given page is not performed within a predetermined period of time, an image indicating an "image defect" is formed on the page where the image defect occurred.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings.

Figure 1:
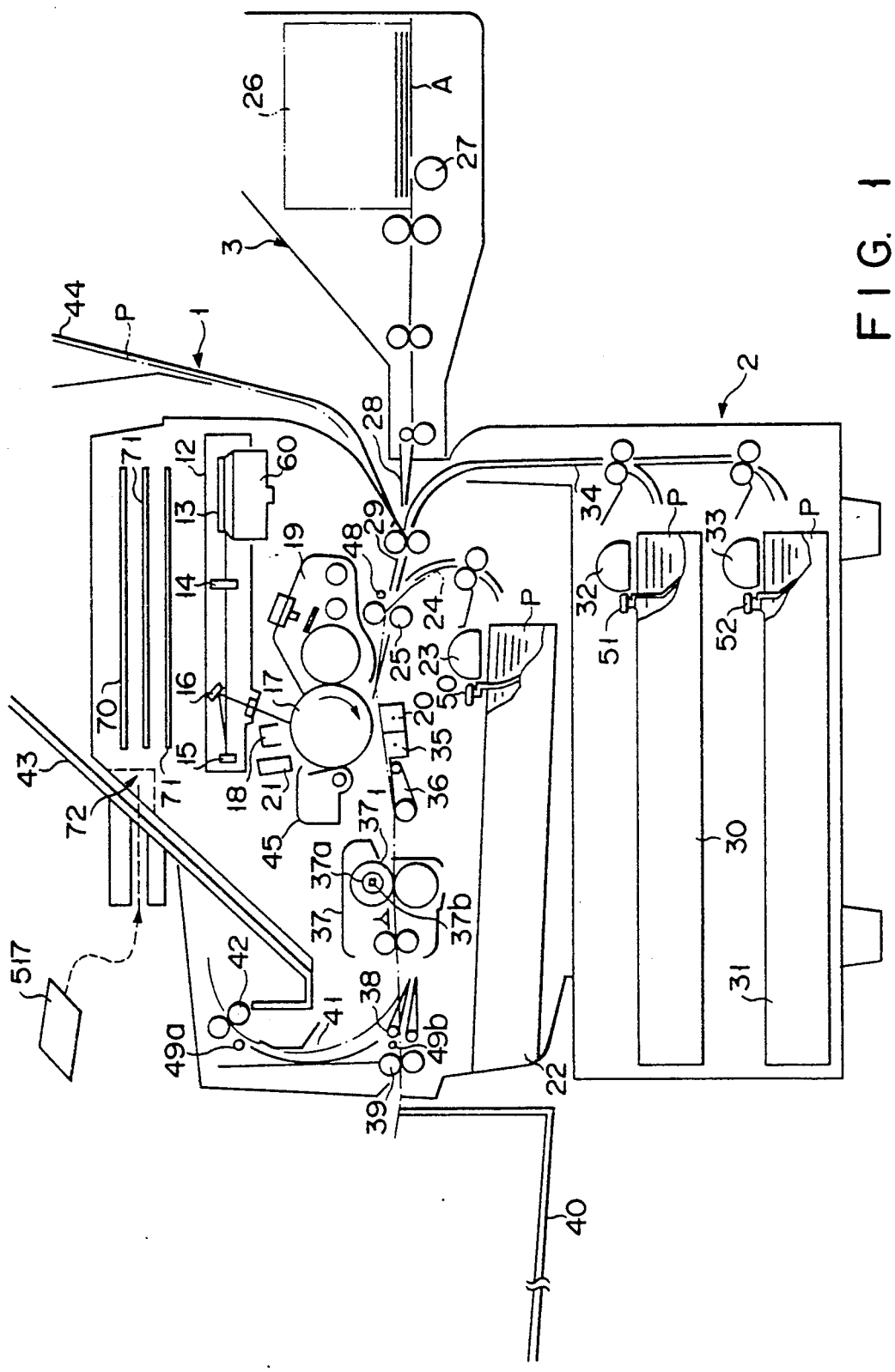
FIG. 1 is a sectional view showing an internal structure of a laser printer.

FIG. 1 shows a structure of an image forming apparatus of the present invention, e.g., an image forming unit apparatus as a laser printer comprising optional equipments.

More specifically, in the image forming unit apparatus, optional equipments such as multi-cassette feeder 2 for feeding paper sheets (normal paper sheets) P having a predetermined thickness, e.g., cut sheets as image recording media into printer 1, envelope feeder 3 for feeding paper sheets (thick sheets) A thicker than the normal sheets such as envelopes as recording media, a jogger as a selector device for distributing paper sheets P or A after image formation in units of predetermined number of sheets, and the like, are connected to laser printer 1.

Multi-cassette feeder 2, envelope feeder 3, and the jogger are connected to a control section (not shown) in the main body of laser printer 1 in an on-line manner. Operation panel 100 (FIG. 2) is arranged on the upper surface of laser printer 1.

In laser printer 1, paper feed cassette 22, feed roller 23, aligning roller pair 25, convey belt 36, gate 38, paper discharge roller pairs 39 and 42, and the like are arranged in addition to a process system, such as laser optical system 12, photosensitive drum 17, electrification unit 18, developing unit 19, copy unit 20, discharging unit 21, peeling unit 35, fixing unit 37, cleaning unit 45, and the like.

Laser optical system 12 comprises a semiconductor laser oscillator (not shown) for generating a laser beam, a collimator lens (not shown) for collimating the laser beam, polygonal mirror (rotary mirror) 13 as a rotary member having an octahedral mirror portion for reflecting the laser beam from the lens for each scanning line, fθ lens 14, mirrors 15 and 16, mirror motor 60 for rotating (driving) polygonal mirror 13, and the like.

In the image forming operation, a laser beam from laser optical system 12 corresponding to an image signal from an external piece of equipment (not shown) (or operation panel 100) is focused on a surface of photosensitive drum 17. Photosensitive drum 17 is rotated in a direction of an arrow in FIG. 1. The surface of drum 17 is charged by electrification unit 18, and then exposed by laser optical system 12 in correspondence with the image signal. More specifically, the laser beam emitted from the semiconductor laser oscillator is scanned at a predetermined speed from the left to the right of photosensitive drum 17 upon rotation of polygonal mirror 13 by mirror motor 60, thereby forming an electrostatic latent image o the surface of drum 17. The latent image is developed by a toner by developing unit 19, thus forming a visual image.

On the other hand, paper sheets P as image recording media in paper feed cassette 22 are picked up one by one by feed roller 23. Each sheet is guided to aligning roller pair 25 via paper guide path 24, and is then fed to a copy section by roller pair 25.

Paper sheet P picked up from paper feed cassette 30 in multi-cassette feeder 2 one by one by feed roller 32 and guided to aligning roller pair 25 via paper guide paths 34 and 29; paper sheet P picked up from paper feed cassette 31 one by one by feed roller 33 and guided to aligning roller pair 25 via paper guide paths 34 and 29; paper sheet A picked up from stacker 26 in envelope feeder 3 one by one by feed roller 27 and guided to aligning roller pair 25 via paper guide paths 28 and 29; or paper sheet P fed from manual paper feed unit 44 and guided to aligning roller pair 25 via paper guide path 29 is fed to the copy section in accordance with an instruction from external equipment or operation panel 100.

Paper sheet P or A fed to the copy section is brought into tight contact with the surface of photosensitive drum 17 on copy unit 20, and the toner image on photosensitive drum 17 is copied onto the sheet upon operation of copy unit 20. Paper sheet P or A on which the toner image is copied is peeled from photosensitive drum 17 upon operation of peeling unit 35, and is fed to fixing unit 37 by convey belt 36. The copied image is thermally fixed on the paper sheet by heat roller 371 for generating heat for a fixing operation. Heat roller $37_1$ incorporates heater lamp 37a used for heating.

Paper sheet P or A after the fixing operation is fed onto paper discharge tray 40 by paper discharge roller pair 39 via gate 38. Alternatively, paper sheet A is fed to upper convey path 41 by gate 38, and is exhausted on paper discharge tray 43 movably supported by the jogger by paper discharge roller pair 42.

After the copy operation, any residual toner is removed from photosensitive drum 17 by cleaning unit 45, and any after image erased by discharging unit 21. In this manner, drum 17 is ready for the next image forming operation.

Note that fixing unit 37 has a unit structure (fuser unit), and is independently detachable from printer 1. Aligning switch 48 for detecting a paper feed error to the copy section side is arranged in front of aligning roller pair 25, and paper discharge switches 49a and 49b, for detecting a paper discharge error, are arranged in front of paper discharge roller pairs 39 and 42, respectively.

Paper sensors 50, 51, and 52 for detecting paper sheets P are respectively arranged above paper feed cassettes 22, 30, and 31, thereby detecting the presence/absence of paper sheets P in paper feed cassettes 22, 30, and 31.

An engine control circuit board carrying engine controller 70 for controlling electrical units arranged in printer main body 1 to control operations for executing electrophotographic processes, and a circuit board carrying printer controller 71 for controlling operations of engine controller 70 are arranged above laser optical system 12.

A maximum of three circuit boards for printer controller 71 can be loaded in accordance with a degree of addition of functions (e.g., kinds of fonts, kanji, and the like are expanded). Functions can be further added by inserting IC cards 517 for adding functions in three IC card connectors 72 arranged at the front edge portion of the circuit board for printer controller 71. A connector (not shown) to be connected to host apparatus 409 (to be described later) as an external output unit such as an electronic computer, a word processor or the like is arranged at the left end face portion of the circuit board for printer controller 71.

Operation panel 100 comprises liquid crystal display 100a for displaying a sheet count, a mode, a guide message, and the like, LED indicator 100b for indicating various operating states by turning on LEDs, switch 100c for instructing various operations, and on-line key 100d for switching an on-line/off-line mode.

The arrangement of the engine control section will be described below.

Figure 2:
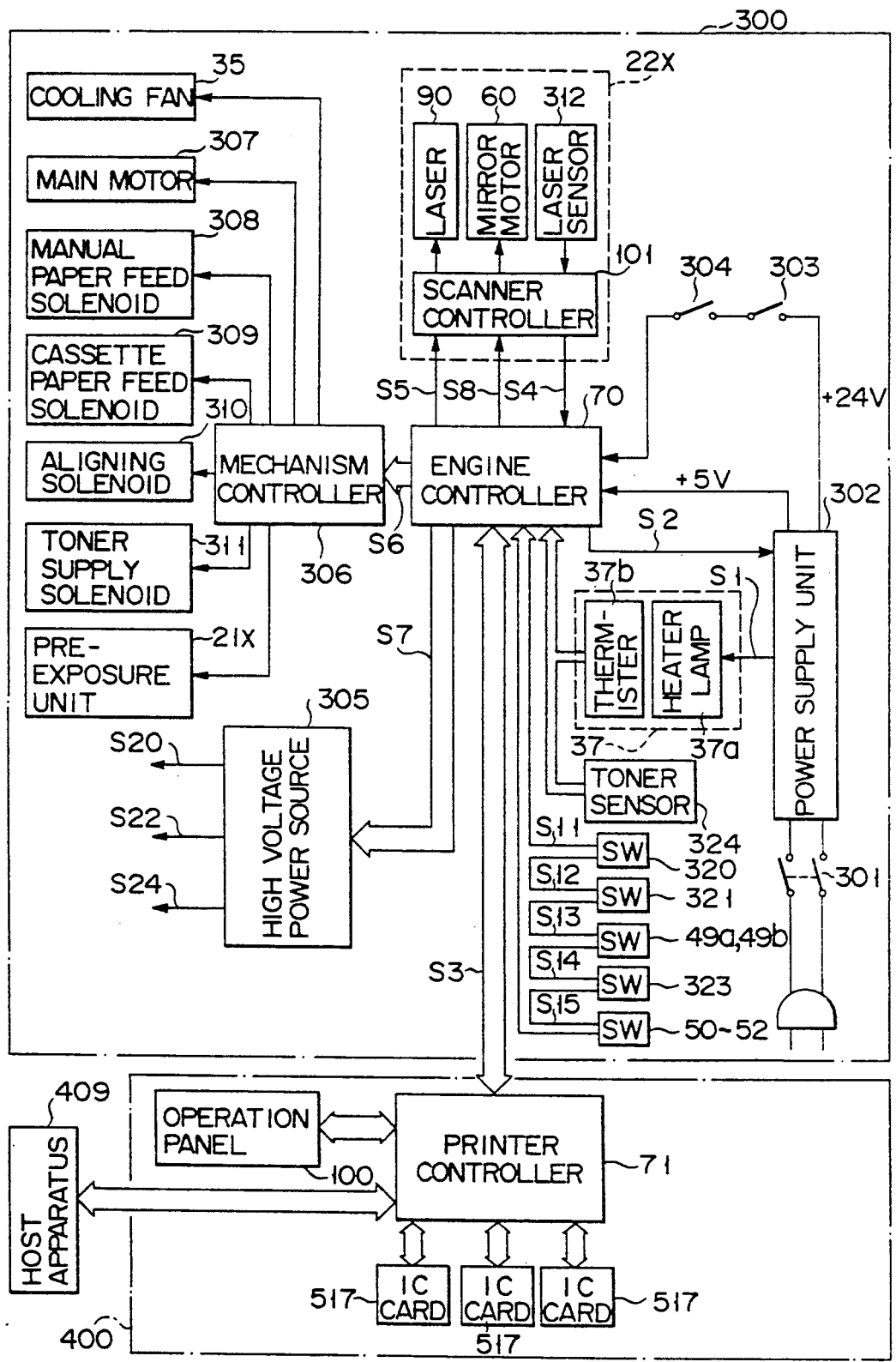
FIG. 2 is a block diagram showing an arrangement of main part of an engine control section.

FIG. 2 is a block diagram showing an arrangement of the main part of engine control section 300. In FIG. 2, reference numeral 302 denotes a power supply unit which outputs power supply voltages of +5 V and +24 V when main switch 301 is turned on. The +5 V power supply voltage is supplied to engine controller 70, and is supplied to printer controller 71 via engine controller 70. The +24 V power supply voltage is supplied to engine controller 70 via cover switches 303 and 304 in turn. The power supply voltage is then supplied to scanner controller 101, high voltage power source 305, and mechanism controller 306 via engine controller 70. Scanner controller 101 then supplies the power supply voltage to semiconductor laser 90 and mirror motor 92, and mechanism controller 306 supplies the power supply voltage to pre-exposure unit 21X, main motor 307, manual feed solenoid 308, cassette paper feed solenoid 309, aligning solenoid 310, toner supply solenoid 311, cooling fan 500, and the like as their driving power source.

Power supply unit 302 includes a zero-crossing switch type heater lamp controller (not shown), comprising, e.g., a photo triac coupler and a triac, for driving heater lamp 37a in fixing unit 3. The +24 V voltage is used as a driving power source for a light-emitting LED of the photo triac coupler. In the heater lamp controller with this arrangement, when the light-emitting LED is turned on/off, the light-emitting photo triac is turned on/off at a zerocrossing point of an AC power source, thereby turning on/off a triac as a main switch element at the next stage. In this manner, AC power source S1 is supplied to or cut from heater lamp 37a. Heater control signal S2 for turning on/off the light-emitting LED is supplied from engine controller 70 to power supply unit 302, and a temperature signal detected by thermistor 37b arranged in fixing unit 37 is supplied to engine controller 70.

Cover switch 303 is turned off when a top cover (not shown) is pivoted upward, and cover switch 304 is turned off when a rear cover (not shown) is opened. Therefore, when the top or rear cover is opened, the +24 V voltage is cut off by switch 303 or 304, so that operations of semiconductor laser 90, mirror motor 60, high voltage power source 305, main motor 307, solenoids 308, 309, 310, and 311, cooling fan 500, heater lamp 37a, and the like are stopped. As a result, an operator can safely touch the interior of printer main body 1.

Figure 3:
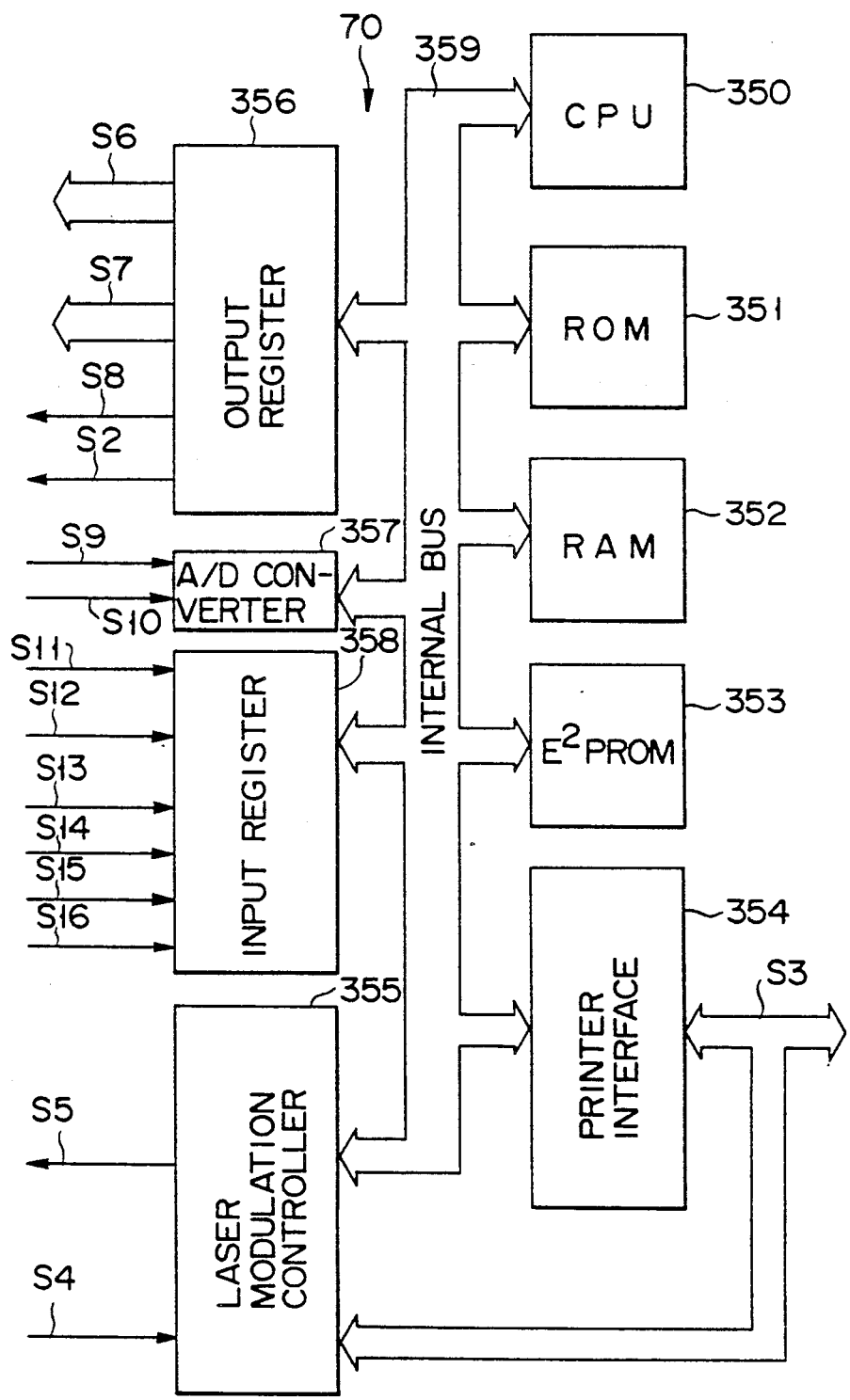
FIG. 3 is a block diagram showing an arrangement of an engine controller.

FIG. 3 is a block diagram showing the arrangement of engine controller 70. In FIG. 3, CPU 350 controls entire engine control section 300, and is operated in accordance with a control program stored in ROM 351. RAM 352 is used as a working buffer for CPU 350. E$^2$PROM 353 stores a total print count, and the like. Printer interface 354 interfaces exchange of interface signal S3 with printer controller 71.

Laser modulation controller 355 periodically and forcibly turns on semiconductor laser 90 in order to generate laser beam detection signal S4, and modulates semiconductor laser 90 in accordance with image data sent from printer controller 71 in response to interface signal S3. In this case, controller 355 outputs laser modulation signal S5 to scanner controller 101.

Output register 356 outputs control signals S6, S7, S8, and S2 for respectively controlling mechanism controller 306, high voltage power source 305, scanner controller 101, and the heater lamp controller. A/D converter 357 receives voltage signals S9 and S10 generated by thermistor 37b and toner sensor 324, and converts these voltage values into digital values. Input register 358 receives state signals S11, S12, S13, S14, S15, and S17 from paper empty switch 320, manual feed switch 321, paper discharge switch 49a and 49b, mount switch 323, aligning switch 48, and paper sensors 50, 51, 52, and 53, and ON/OFF state signal S16 of the +24 V voltage.

Internal bus 359 is used for exchanging data among CPU 350, ROM 351, RAM 352, E$^2$PROM 353, printer interface 354, laser modulation controller 355, output register 356, A/D converter 357, and input register 358.

Mechanism controller 306 includes drivers for driving various motors, clutches, and solenoids. These drivers are ON/OFF-controlled in accordance with binary control signal S6 output from output register 356. More specifically, each driver is turned on when signal S6 is "1", or is turned off when it is "0", thereby supplying or cutting off the +24 V voltage to or from pre-exposure unit 21X, main motor 307, solenoids 308 to 311, and cooling fan 500.

Scanner controller 101 includes drivers for semiconductor laser 90 and mirror motor 60. Semiconductor laser 90 is ON/OFF-controlled by laser modulation signal S5 output from laser modulation controller 355. Mirror motor 60 is ON/OFF-controlled by control signal S8 output from output register 356.

Laser beam detection sensor 312 comprises a PIN diode. When laser beam a passes through laser beam detection sensor 312, a current proportional to its light energy flows through the PIN diode. This current signal is sent to laser modulation controller 355 as laser beam detection signal S4.

High voltage power source 305 outputs developing bias, electrification, and copy high voltage signals S20, S22, and S24 to a developing bias power supply unit (not shown), electrification unit 18, and a wire high voltage supply unit (not shown) of copy unit 20. These signals are ON/OFF-controlled by "1" or "0" level of control signal S7 output from output register 356.

As described above, in engine control section 300, a power supply voltage is supplied to electrical circuits via engine controller 70, and respective units are controlled by binary control signals output from engine controller 70. Engine control section 300 is coupled to printer control section 400 (to be described later) via interface signal S3.

The arrangement of printer control section 400 will be described below.

Figure 4:
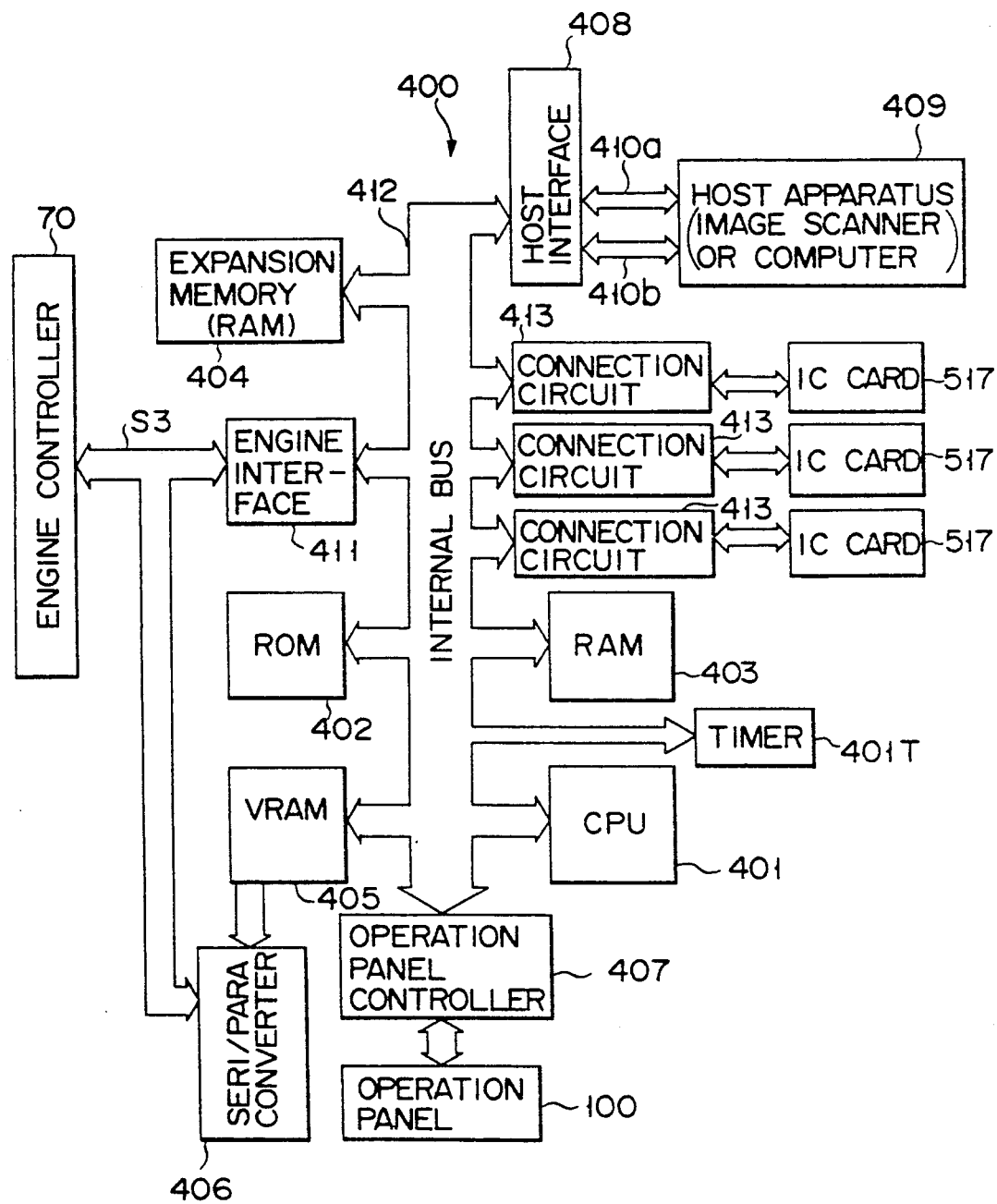
FIG. 4 is block diagram showing the of main part of the printer control section.

FIG. 4 is a block diagram showing an arrangement of main part of printer control section 400. In FIG. 4, CPU 401 controls the entire printer control section 400. CPU 401 is connected to timer 401T via internal bus 412. This timer is used for the timing control of respective processing operations to be executed by CPU 401. ROM 402 stores a control program. CPU 401 is operated in accordance with the program stored in ROM 02. ROM 402 also stores an identification number which is verified when data is altered, data associated with paper sheet P such as a top margin, a left margin, a paper type, and the like, message information to be informed to an operator, bit-image data for indicating a defective image, and the like.

RAM 403 is used as a page buffer for temporarily storing image data sent from host apparatus 409. Expansion memory 404 is a large-capacity memory used when RAM 403 cannot store data for one page when image data sent from host apparatus 409 has a large data volume, such as bit map data.

Video RAM 405 stores image data expanded to bit image, and its output is supplied to serial/parallel converter 406. Serial/parallel converter 406 converts image data expanded to bit-image data in video RAM 405 and sent as parallel data into serial data, and supplies the serial data to engine controller 70.

Video RAM 405 is used as a scan buffer (partial memory) for storing bit-image data expanded to bit-image data. The scan buffer stores bit-image data in units of 64 lines (one band unit). Note that the partial memory may be arranged in RAM 403 or 404.

Host interface 408 is used for exchanging data between host apparatus 409 comprising an electronic computer or an image reading apparatus (image scanner) and printer control section 400. It comprises two kinds of transfer lines, i.e., serial transfer line 410a and parallel transfer line 410b. These lines can be selectively used in accordance with a kind of data transferred between host apparatus 409 and printer control section 400.

Engine interface the 411 interfaces exchange of interface signal S3 between printer controller 71 and engine controller 70. Each of connection circuits 413 cuts off a power supply voltage to be supplied to IC card 517 and signal lines, when IC board 517 is inserted in or removed from a connector (not shown), thereby preventing data stored in IC card 517 from being destroyed by noise generated when the card is inserted or removed.

Operation panel controller 407 performs display control of a guide message on liquid crystal display 100a on operation panel 100, ON/OFF/flashing control of LED indicator 100b, control for sending data input from switch 100c to CPU 401, and the like. Internal bus 412 is used for exchanging data among CPU 401, ROM 402, RAM 403, expansion memory 404, video RAM 405, operation panel controller 407, host interface 408, engine interface 411, and connection circuits 413.

IC card 517 comprises a nonvolatile memory, such as a battery backup static RAM, an EPROM, an EPROM, a mask ROM, or the like. Each IC card 517 stores character fonts, an emulation program, and the like.

Figure 5A:
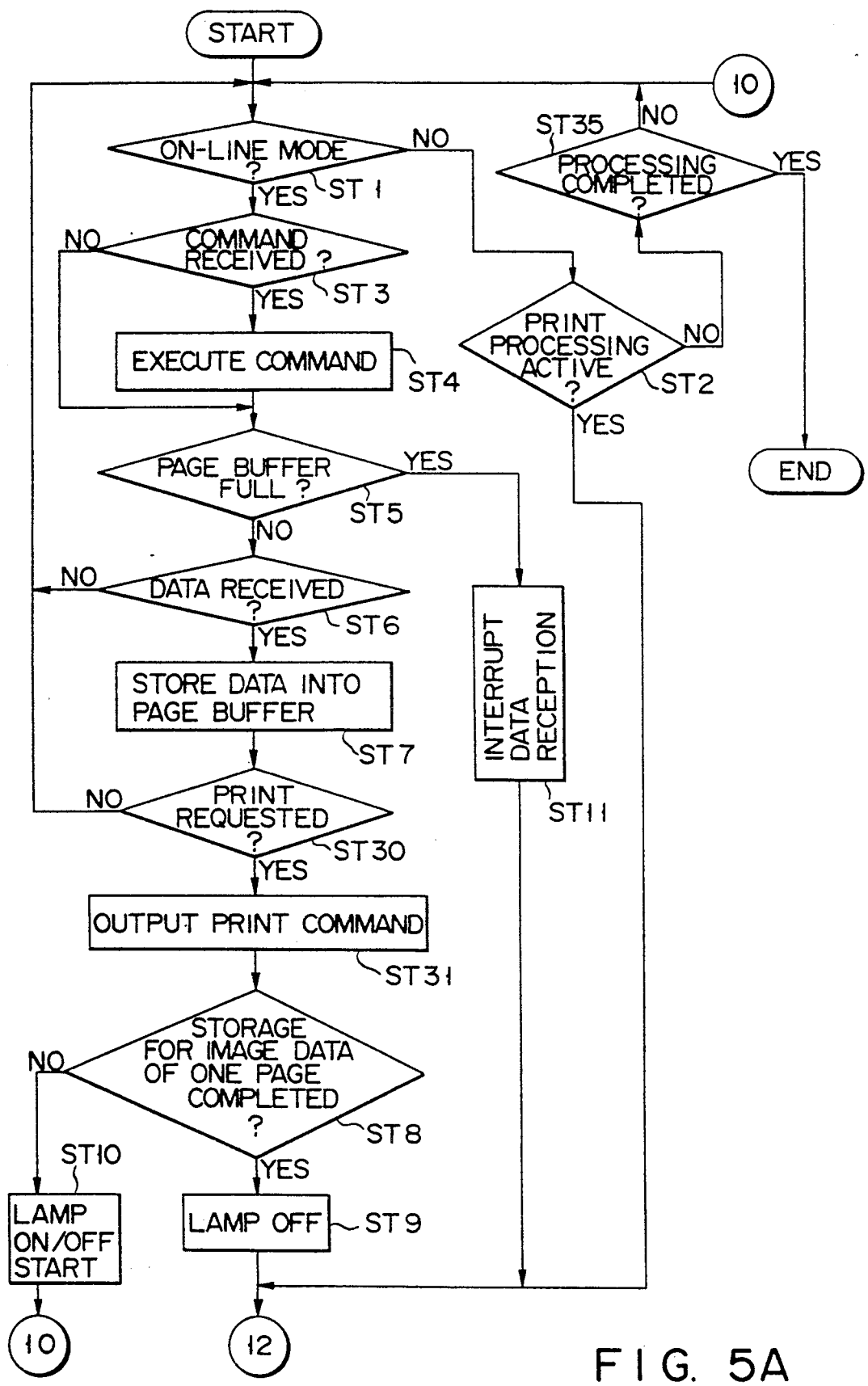
FIGS. 5A to 5C are flow charts showing the operation of the printer controller.

The operation of printer control section 400 (in particular, CPU 401) shown in FIG. 4 will be described below with reference to the flow charts shown in FIGS. 5A, 5B, and 5C.

For example, if the laser printer shown in FIG. 1 is set in an off-line state, and CPU 401 detects this off-line state (NO in ST1), it is checked if print processing of previous data received from host apparatus 409 is completed (ST2). If it is determined that print processing is being executed (YES in ST2), the flow branches to step ST12 in FIG. 5B to continue the print processing. On the other hand, if it is determined that processing of printer control section 400 itself is not completed yet (NO in ST35) although the print processing has been completed (NO in ST2), steps ST1 and ST2 are repetitively executed to establish an idling state, thus waiting for an on-line state of the laser printer.

If it is determined that the laser printer is set in the on-line state (YES in ST1), it is checked if data sent from host apparatus 409 is a command. If it is determined that the received data is a command (YES in ST3), the received command is executed (ST4); otherwise, the flow skips command execution step ST4, and advances to step ST5. For example, the command defines attributes of data following the command, and controls the printer without exchanging data.

It is then checked if the page buffer arranged as a buffer for receiving data in RAM 403 is full. If it is determined that the buffer is not full (NO in ST5), it is checked if data sent from host apparatus 409 is image data (VD). If it is determined that the received data is not image data (NO in ST6), the flow returns to step ST1, and the series of steps described above are repetitively executed to wait for reception of a command or image data. If it is detected in this state that image data is received (YES in ST6), the received image data is sequentially stored in the above-mentioned page buffer (RAM 403) (ST7).

Subsequently, it is checked if a print request is issued. If it is determined that no print request is issued (NO in ST30), it is determined that the engine side is not ready for printing. In this case, the flow returns to step ST1, and the series of steps described above are executed again to wait for a print request. If the print request is detected (YES in ST30), it is determined that engine control section 300 is ready for printing, and CPU 401 out a print command (ST31).

It is then checked if the storage of image data for one page is completed. If it is determined that the storage operation is not completed (NO in ST8), a "data" lamp of LED indicator 100b arranged in operation panel 100 begins to flash (ST10). In this manner, during the data reception operation, the "data" lamp is flashed to inform the current state to an operator. The flow returns to step ST1, and the series of steps described above are executed to wait until image data for one page is stored in the page buffer (403).

If it is determined that storage of image data of one page is completed upon repetitive execution of the series of steps (YES in ST8), the "data" lamp is turned off (ST9), and data reception processing is ended. The control advances to print processing in step ST12 and subsequent steps.

If it is determined in step ST5 that the page buffer (403) is full (YES in ST5), the data reception operation is interrupted (ST11), and the control also advances to print processing in step ST12 and subsequent steps.

Figure 5B:
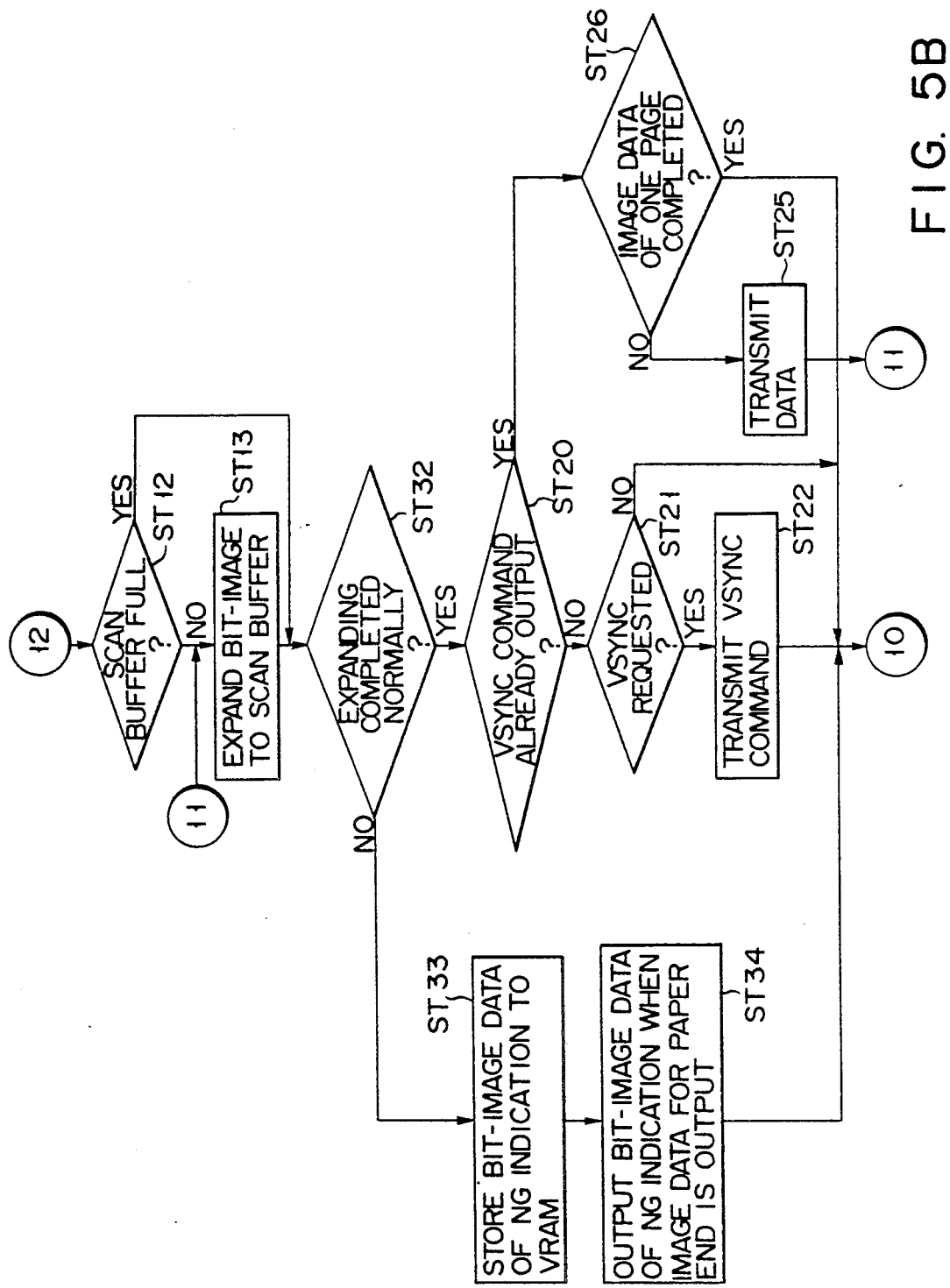
Figure 5C:
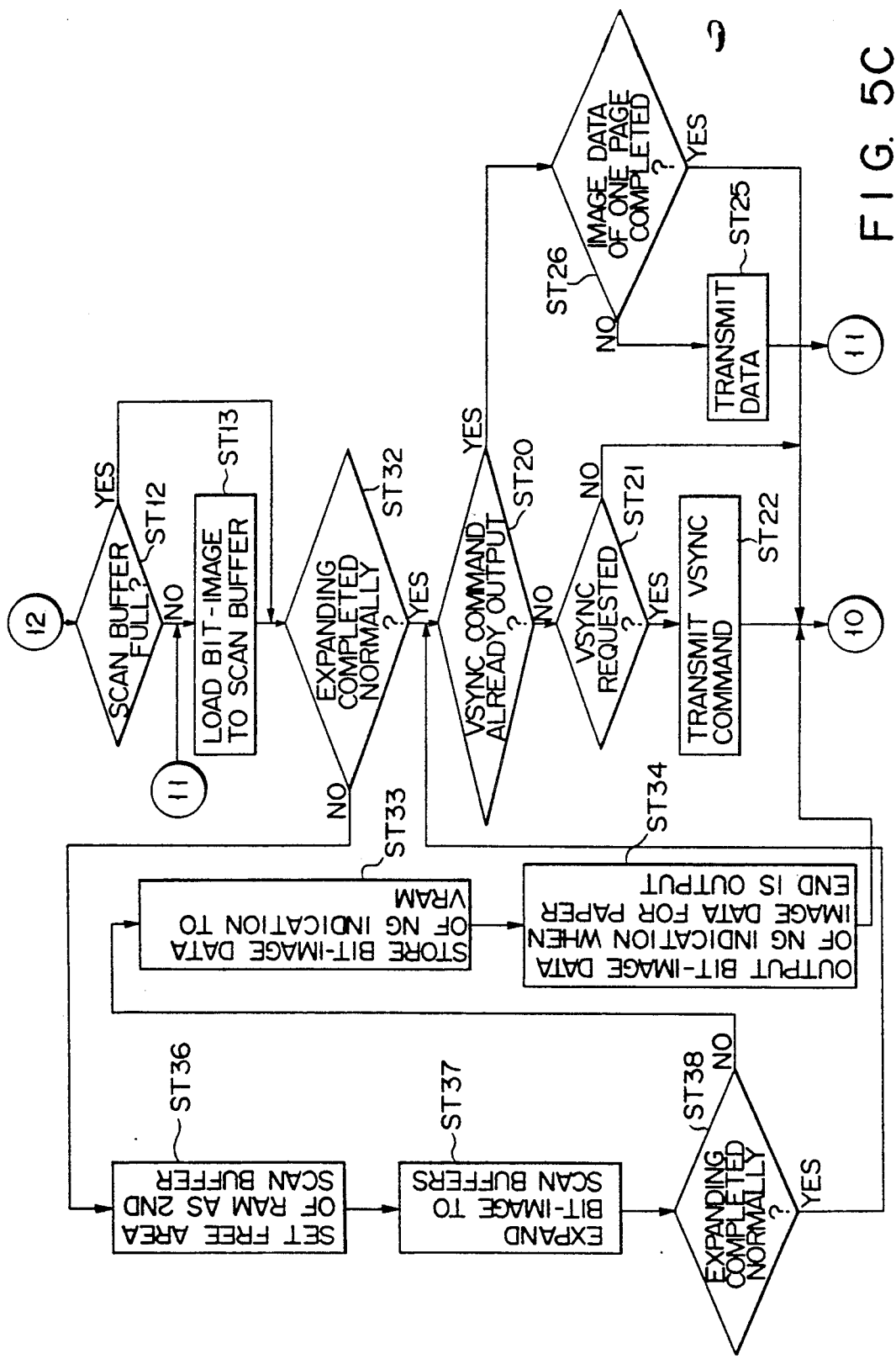

Upon completion of storage of image data for one page in the page buffer (403), it is checked if the scan buffer allocated on video RAM 405 is full (ST12 in FIG. 5B). If it is determined that the scan buffer is not full (NO in ST12), CPU 401 converts image data corresponding to 64 lines of image data stored in the page buffer into bit-image data, and stores the bit-image data in video RAM 405, serving as the scan buffer (ST13). On the other hand, if it is determined that the scan buffer is full (YES in ST12), the flow skips step ST13.

If it is determined that bit image expanding processing is normally completed (YES in ST32), it is checked if a VSYNC command has already been output (ST20). If it is determined that the VSYNC command is not output yet (NO in ST20), it is checked if a VSYNC request is issued from the engine side (ST21). If no VSYNC request is detected (NO in ST21), the flow returns to step ST1, and the controls wait for the VSYNC request while executing the series of steps. If it is determined that a VSYNC request is issued (YES in ST21), the VSYNC command is output to the engine side (ST22), and the flow returns to step ST1 to wait until horizontal sync signal HSYNC0 and video clock VCLK0 are input.

If it is determined that the VSYNC command has already been output (YES in ST20), it is checked if transfer of image data for one page is completed (ST26). If it is determined that transfer of image data is not completed yet (NO in ST26), bit-image data for 64 lines stored in the scan buffer (403) is output to the engine side (70) in synchronism with horizontal sync signal HSYNC0 and video clock VCLK0 (ST25). Thereafter, the flow returns to step ST13, and CPU 401 waits for completion of transfer of image data for one page while executing the series of steps again.

In this manner, when transmission of image data for one page is completed, the flow returns to step ST1, and printer controller 71, is reset to an initial state, so that it is ready for the transfer of image data of the next page.

If it is determined that expanding processing to bit-image data in step ST13 is not completed within a predetermined allowable time (i.e., image expanding processing cannot be normally executed) (ST32), CPU 401 interrupts bit-image expanding, generation, and transfer processing operations of image data stored in the page buffer (403), and outputs a convey command for paper sheet P. In addition, CPU 401 reads out bit-image data of NG indication (e.g., black pattern data used as an "NG" mark) from ROM 402, and stores it in video RAM 405 (ST33). Judgment in step ST32 is made by measuring a time from when image expanding processing is started in the scan buffer until the processing is completed using timer 401T. When image data for an end portion of paper sheet P is output, CPU 401 outputs the bit-image data of NG indication to the engine side in synchronism with horizontal sync signal HSYNC0 and video clock VCLK0 (ST34). After the bit-image data of NG indication is output, CPU 401 causes liquid crystal display 100a of operation panel 100 to set off an alarm indicating the information of a defective image. The flow then returns to step ST1, and processing for the following page is continued.

In step ST32 shown in FIG. 5B, once an expanding processing time exceeds the allowable time, the corresponding print page is processed as a defective page. Alternatively, once the expanding processing is unsuccessful, it may be tried once more. The sequence in this case is shown in FIG. 5C.

More specifically, if a time-over occurs due to overflow of the scan buffer in image expanding processing in step ST13 before completion of the image expanding processing (NO in ST32), CPU 401 sets a storage area (free area) of a portion of, e.g., RAM 403 as a second scan buffer area (ST36).

Bit-image data is expanded again to the scan buffer whose area is increased, since the second scan buffer is added to the original scan buffer (ST37).

If the re-expanding processing of bit-image data is normally performed, i.e., if the re-expanding processing is completed within a predetermined period of time (YES in ST38), this means that a defective image can be removed, and the flow advances to step ST20.

On the other hand, if the re-expanding processing of bit-image data cannot be normally performed, i.e., if the re-expanding processing cannot be completed within the predetermined period of time (NO in ST38), this means that a defective image cannot be removed, and the flow advances to step ST33. Thereafter, the same processing as in FIG. 5B is executed.

Figure 6:
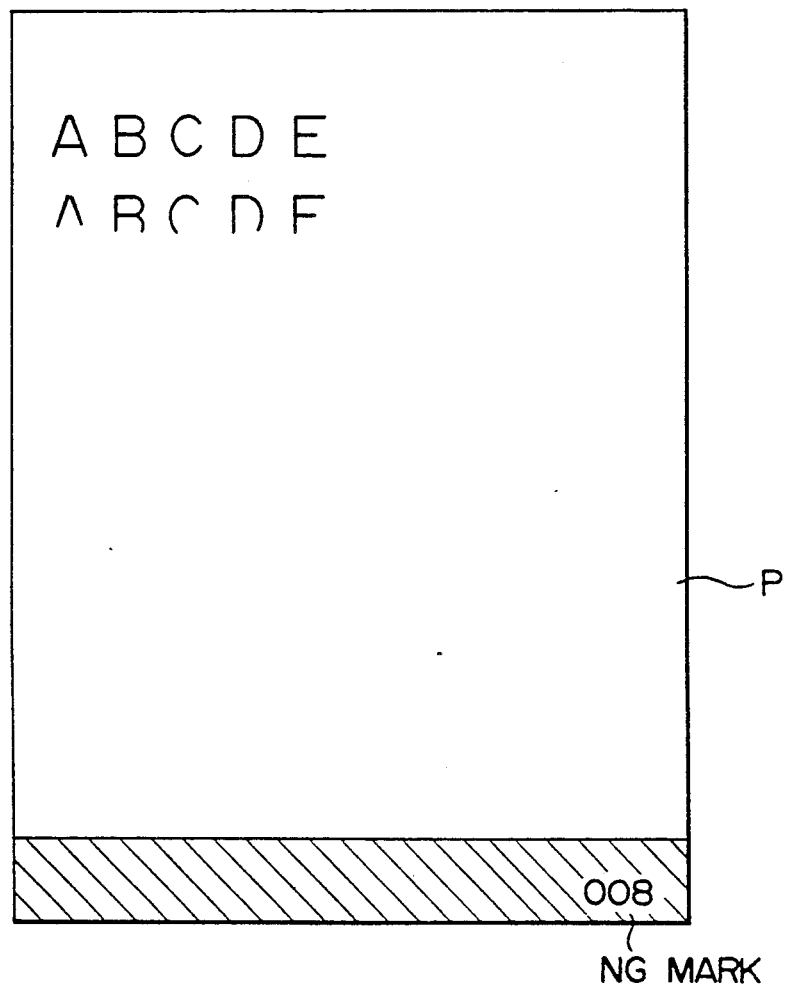
FIG. 6 shows the state of a paper sheet when a defective image is printed.

A toner image formed on photosensitive drum 17 by developing unit 19 is copied by copy unit 20 on paper sheet P. In this case, when bit-image data of NG indication is supplied from print control section 400, a bar (black portion) of NG indication is copied, i.e., printed as an NG mark on a lower portion of paper sheet P, as shown in FIG. 6. In this case, a copy count (e.g., "008") extracted from a copy counter (not shown) may be added on a portion of an NG indication bar.

When continuous print operations are performed for a plurality of paper sheets upon reception of image data from the host apparatus, if it is detected that a defective image is formed, an image corresponding to bit-image data for NG indication (black portion) is formed on a paper sheet with the defective image. Thus, a page of the defective image during the continuous print operations can be specified by a mark (black portion) indicating that the defective image is formed on the page. Thereafter, a print content of the specified page is changed so as not to generate a defective image, and only the page is printed again, thus obtaining a necessary print result. As a result, time and paper sheets can be saved.

As described above, according to the present invention, an image forming apparatus which can specify a certain page or pages on which a defective image or images is or are formed can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus comprising:
   means for receiving data to be printed from a host apparatus;
   means for sequentially forming bit-image data in units of predetermined portions based on data received by said receiving means;
   means for detecting the formed bit-image data when said forming means cannot form the bit-image data within a predetermined period of time;
   means, responsive to said detecting means, for generating a pattern representing that the bit-image data is defective; and
   means for printing the formed bit-image data on an image recording medium.

2. An apparatus according to claim 1, further comprising means for storing bit-image data including no defective indication pattern and bit-image data including the defective indication pattern, and
   said forming means includes means for sequentially forming bit patterns corresponding to bit-image data in said storing means on said image recording medium.

3. An apparatus according to claim 2, wherein said forming means includes means for holding the defective indication pattern in advance.

4. An apparatus according to claim 2, wherein said image recording medium includes a paper, and
   the defective indication pattern is formed on an end portion of the paper.

5. An apparatus according to claim 1, further comprising a partial memory in which bit-image data generated from the received data is expanded, and
   said detecting means includes:
   means for measuring an expansion time of the bit-image data expanded in said partial memory; and
   means for comparing the expansion time with a predetermined time limit, and for, when the expansion time exceeds the time limit, detecting that the bit-image data is defective.

6. An apparatus according to claim 2, wherein said storing means includes a partial memory in which bit-image data generated from the received data is expanded, and
   said detecting means includes:
   means for measuring an expansion time of the bit-image data expanded in said partial memory; and
   means for comparing the expansion time with a predetermined time limit, and for, when the expansion time exceeds the time limit, detecting that the bit-image data is defective.

7. An apparatus according to claim 1, further including a scan buffer in which bit-image data generated from the received data is expanded, and
   said detecting means includes:
   means for measuring an expansion time of the bit-image data to be expanded in said scan buffer; and
   means for comparing the expansion time with a predetermined time limit, and for, when the expansion time exceeds the time limit, increasing a storage capacity of said scan buffer.

8. An apparatus according to claim 2, wherein said storing means includes a scan buffer in which bit-image data generated from the received data is expanded, and
   said detecting means includes:

means for measuring an expansion time of the bit-image data to be expanded in said scan buffer; and means for comparing the expansion time with a predetermined time limit, and for, when the expansion time exceeds the time limit, increasing a storage capacity of said scan buffer.

9. An image forming apparatus comprising:

means for receiving from a host apparatus data to be printed;

means for forming bit-image data from data received by the receiving means;

means for detecting if the formed bit-image data is defective;

means, responsive to the detecting means, for printing on an image recording medium the formed bit-image data and a pattern representing that the data is defective; and a scan buffer in which bit-image data generated from predetermined image data is expanded;

wherein said detector means further includes:

means for measuring an expansion time of the bit-image data to be expanded in the scan buffer; and means for comparing the expansion time with a predetermined time limit and for increasing storage capacity of the scan buffer when the expansion time exceeds the time limit.

10. An apparatus according to claim 9, wherein said detecting means further includes:

means for measuring a second expansion time of the bit-image data to be expanded in said scan buffer whose storage capacity is increased; and means for, when the second expansion time does not exceed the predetermined time limit, stopping addition of the defective indication pattern.

11. An apparatus according to claim 10, wherein said detecting means further includes:

means for, when the second expansion time exceeds the predetermined time limit, detecting that the bit-image data is defective.

12. An image forming apparatus comprising:

means for receiving data to be printed from a host apparatus;

means for forming bit-image data from data received from the receiving means;

means for detecting if the formed bit-image data is defective;

means, responsive to the detecting means, for printing the formed bit-image data nd a pattern representing that the data is defective on an image recording medium; and a partial memory in which bit-image data generated from predetermined image data is expanded;

wherein, said detecting means further includes;

means for measuring expansion time of the bit-image data expanded in the partial memory; and means for comparing the expansion time with a predetermined time limit, and, when the expansion time exceeds the time limit, for detecting that the bit-image data is defective.

* * * * *